No. 742,595. PATENTED OCT. 27, 1903.
L. A. CONNER, Jr.
JACK.
APPLICATION FILED NOV. 3, 1902.
NO MODEL. 5 SHEETS—SHEET 1.

WITNESSES

INVENTOR

No. 742,595. PATENTED OCT. 27, 1903.
L. A. CONNER, Jr.
JACK.
APPLICATION FILED NOV. 3, 1902.
NO MODEL. 5 SHEETS—SHEET 3.

WITNESSES
INVENTOR

No. 742,595. PATENTED OCT. 27, 1903.
L. A. CONNER, Jr.
JACK.
APPLICATION FILED NOV. 3, 1902.
NO MODEL.
5 SHEETS—SHEET 4.

WITNESSES
INVENTOR

No. 742,595. PATENTED OCT. 27, 1903.
L. A. CONNER, Jr.
JACK.
APPLICATION FILED NOV. 3, 1902.
NO MODEL. 5 SHEETS—SHEET 5.

WITNESSES
INVENTOR

No. 742,595. Patented October 27, 1903.

UNITED STATES PATENT OFFICE.

LENDELL A. CONNER, JR., OF PITTSBURG, PENNSYLVANIA.

JACK.

SPECIFICATION forming part of Letters Patent No. 742,595, dated October 27, 1903.

Application filed November 3, 1902. Serial No. 129,871. (No model.)

*To all whom it may concern:*

Be it known that I, LENDELL A. CONNER, Jr., of Pittsburg, Allegheny county, Pennsylvania, have invented a new and useful Jack, of which the following is a full, clear, and exact description, reference being had to the accompanying drawings, forming part of this specification, in which—

My invention relates to the class of jacks, and is designed to reduce the number of working parts, to simplify the construction, and to make their movements more positive and certain than in previous jacks.

The invention consists in providing a latch device or prop which is positively actuated to hold one pawl out of engagement for a certain interval during lowering, which latch is then tripped to allow the pawl to engage after the bar has been lowered one tooth.

It also consists in providing means whereby the movement of the lever positively retracts the lifting-pawl during lowering, and, further, in providing means independent of the casing which positively moves such pawl in to engage the tooth, while the other pawl is held out of position during lowering.

The invention further consists in providing mechanism whereby a short stroke of the lever will lift the bar tooth by tooth, while a longer stroke of the lever will give step-by-step lowering.

It also consists in providing a limiting stop or stops for the lever, which will prevent the longer stroke when lifting is desired and which is thrown out of action in lowering to allow the longer stroke to be taken.

It also consists in a jack having a single member in addition to the pawls, which single member will act to reverse the movement of the lifting-bar and in such a member which is positively actuated in both directions by the movement of the lever.

It further consists in the construction and arrangement of the parts, as hereinafter more fully described and claimed.

In the drawings, referring to the form of Figs. 1 to 10, inclusive, 2 represents the casing, 3 the lifting-bar, and 4 the actuating-lever of the jack. The head of the lever is pivoted to a pin 5 in the sides of the casing and is provided with an inner extension 6, to which a lifting-pawl 7 is pivoted by means of a pin 8, having at one end, at one side of the toothed bar, a projecting cam or lug 9. The pawl 7 is provided with a downwardly-projecting tailpiece 10, which in the lowering of the rack-bar is adapted to engage a projection 11 on the casing to throw back the pawl. The other pawl 12, which I have shown as in the form of a detent-pawl, is of U form, is pivoted below the upper end of the lifting-pawl, and is mounted in the casing in the ordinary manner. This arrangement of the detent-pawl in such a manner that it engages the teeth at a lower level than the upwardly-projecting lifting-pawl I believe to be new, and it constitutes an important feature of my invention, as it makes the construction compact and simplifies the operating mechanism. One leg of this detent-pawl is provided with a projecting lug 13, having a propping-face 14, which is engaged at certain times by a projecting pivoted portion of the lever, forming a prop or latch 15. The prop or latch is pivoted about the pin 5 for the lever-arm, and its hub is provided with a notched or recessed portion 16, within which moves a pin or projection 17 on the lever. The end 18 of this prop or latch is of a suitable form to engage the propping-face 14 of the detent-pawl.

Figures 1, 19:
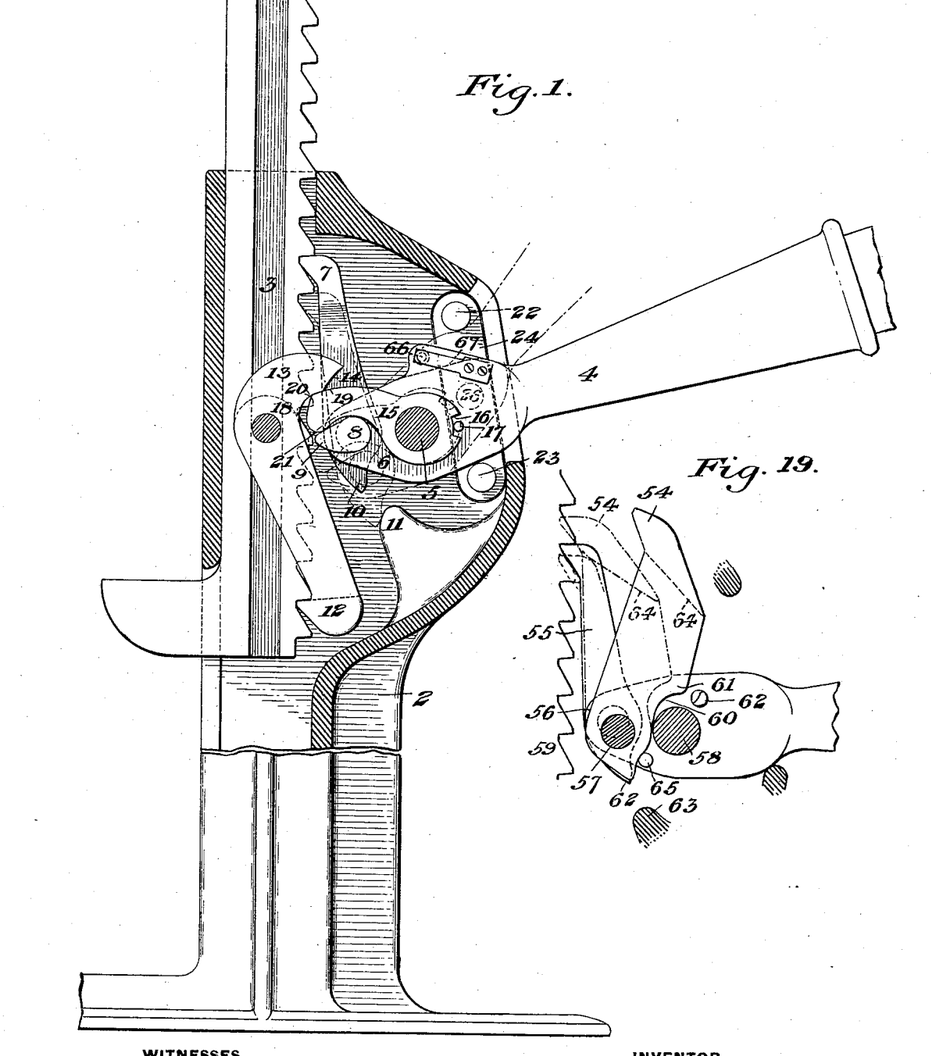
Figure 1 is a sectional side elevation showing a lifting-jack constructed in accordance with my invention.
Fig. 19 is a diagrammatic side elevation showing another form with the detent extending upwardly.
Figures 2, 3, 4, 5:
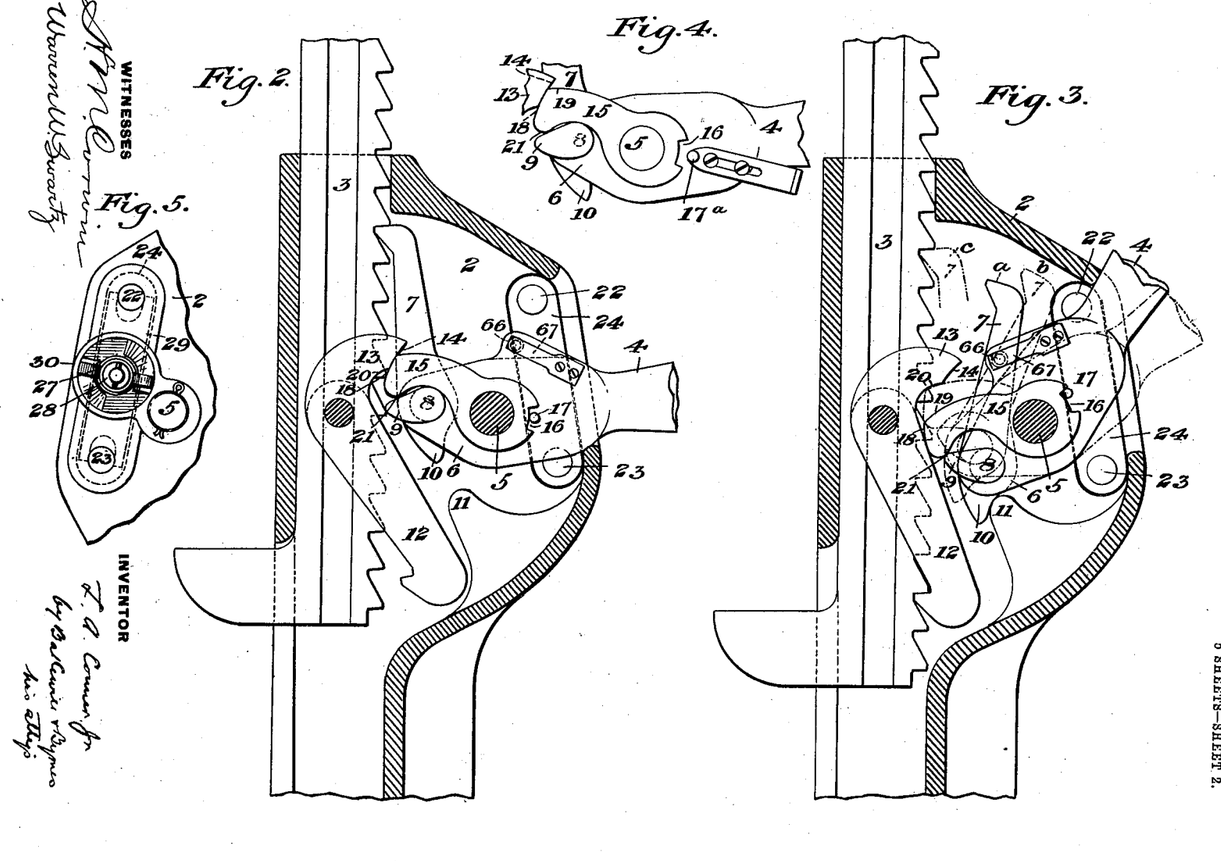
Figs. 2 and 3 are partial sectional side elevations showing different positions of the parts during step-by-step lowering.
Fig. 4 is a detail view showing an attachment for dropping the bar.
Fig. 5 is a broken front elevation of the stop-shifting device.
Figure 6:
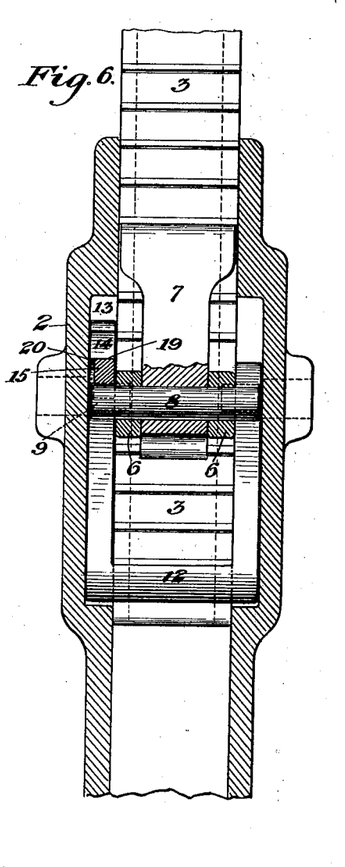
Fig. 6 is a rear elevation of the operating parts, partly in section, at the pivot of the lifting-pawl.
Figures 7, 8, 9, 10, 11:
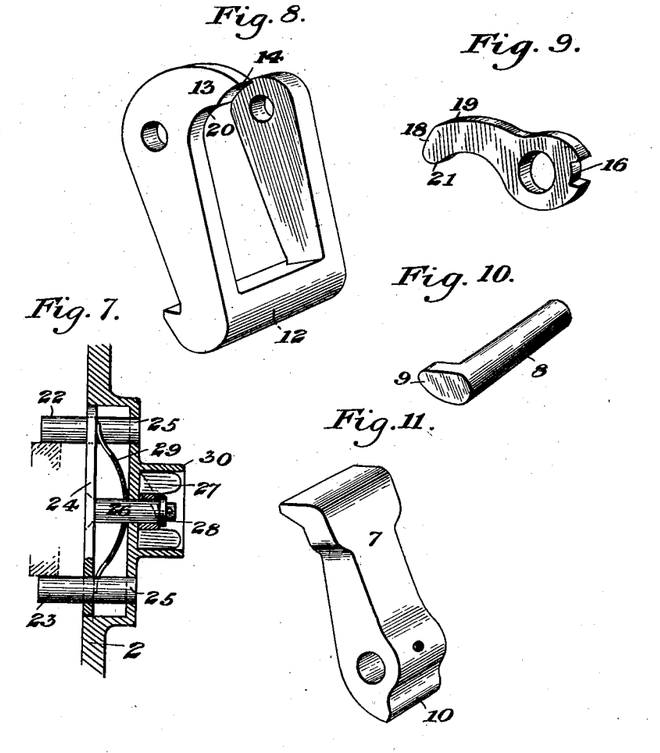
Fig. 7 is a sectional side elevation of the stop mechanism.
Figs. 8, 9, 10, and 11 are perspective detail views showing, respectively, the detent-pawl, the latch, the latch-pin, and the lifting-pawl.

In the operation of this jack a short up-and-down stroke will lift the toothed bar step by step in the ordinary manner, and in the movements of the lifting-bar the prop, the lug 9, and the stop 11 do not act, since the prop is not moved upwardly into propping position. The dotted lines of Fig. 1 show the parts in position when the lever is lifted for taking the next tooth and lifting the bar, while the full lines show the down position of the lever after it has been lifted one tooth and the detent-pawl has swung into the next tooth by gravity. When it is desired to lower the bar step by step, the lever is lifted to a greater extent, and during the latter part of this lifting movement the tail of the lifting-pawl engages the stop or tail 11, thus throwing the lifting-pawl backwardly into the position indicated at $a$ in Fig. 3, the parts then being in the position shown by the full lines in this figure. As the lever is now lowered its inner end moving upwardly carries the lifting-pawl back into the position indicated by dotted lines at $b$, and the face 19 of the latch or prop, which is lifted by pin 8, engages the curved portion 20 of the lug 13. The further movement of the lever then throws in the lifting-pawl by the cam action of the lug 9 upon the lower face 21 of the prop, which is at this moment held by the face 20 of the detent-pawl which is supporting the load. The lifting-pawl thus being brought into engagement with the next tooth, as indicated at $c$ in Fig. 3, the further movement of the lever causes the lifting-pawl to take the load and then by the cam action of the portion 19 of the prop upon the face 20 of the detent-pawl swings this detent-pawl out of engagement, and in the last of this down movement the prop is forced into the position shown in full lines in Fig. 3. It will be noted that the swinging out of the detent-pawl and its propping in the out position occurs during the last part or excess down movement when the load is again taken upon the lifting-pawl and is caused by the pin 8 acting upon the prop. The positive movement of the prop during this action may, however, be obtained by the pin 17 acting upon the lower part of the notch at the rear end of the prop, the notch being made shorter. Now on raising the lever to lower the bar the prop will retain its position, holding out the detent-pawl until the pin 17 engages the upper shoulder of the notch 16, when the prop will be swung down and the detent-pawl will swing by its own gravity into the next tooth. It is therefore clear that a short stroke will lift the bar tooth by tooth, while a longer stroke will lower it tooth by tooth. In order to prevent the longer stroke when it is desired to lift, I preferably provide limiting-stops for the lever, which may be drawn out of position to allow the longer stroke to continue in lowering. Thus in this form I show the limiting-stop as consisting of pins 22 and 23, which are secured to a vertically-extending bar 24, held within recessed pocket in the side portion of the casing. These pins project through in the side of the casing, as shown at 25, and a third pin 26 is secured to the bar and projects through an intermediate hole in the casing. The external portion of this pin is surrounded by thumb-nut 27, having inner cam-faces which coact with faces upon the casing. This thumb-nut bears against a collar 28 upon the pin, and by its rotation the stops 22 and 23 are drawn outwardly against the action of a leaf-spring 29. The thumb-nut is preferably guarded by a surrounding flange 30, and by turning this nut the stops may be retracted or allowed to move into stopping position by the action of the spring. When the stops are retracted, the movement of the lever in its longest stroke may be limited by the upper and lower ends of the slot in the casing through which the lever projects. In order to provide for a quick drop of the bar, I use a movable pin $17^a$, which is carried by a slide adjustably secured to the lever-head, as shown in Fig. 4. By drawing back the pin when the parts are in position for step-by-step lowering and then depressing the lever the detent-pawl will be thrown out and remains out, while on the upstroke the lifting-pawl will be forced out, thus entirely releasing the bar. The same result can be obtained by a spring-catch to engage the detent-pawl, which catch can be set by the operator or by making the pin 8 movable endwise, so that its cam will not engage the lifting-pawl, in which case the lifting-pawl could remain out and the detent be forced out. In order to permit the jack to be used at any angle, I provide a device for holding back the lifting-pawl after it is forced back. This may consist of a pin 66, which is pressed forward by a suitable spring 67, attached to the operating-handle, as shown in Figs. 1, 2, 3, and 20. When the pawl is thrown back during lowering, the catch or retainer will engage the side of the pawl and retain it in the tipped-back position until such pawl is forced forward by the cam action upon it. As the pawl is forced in the pin 66 is forced back out of engagement with the slight depression in its side face. During the lifting operation the pin 66 is back of the pawl and out of engagement with it at such times. This catch is applicable to the lifting-pawl in all forms of my device.

Figures 12, 14, 15:
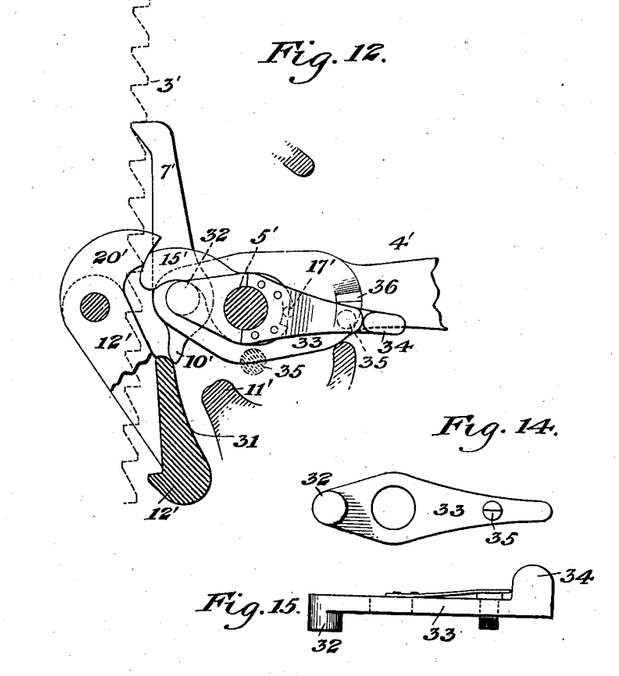
Figs. 12 and 13 are sectional side elevations showing another form of the operating mechanism with the parts in different positions during lowering.
Figs. 14 and 15 are detail views of the latch mechanism of this form.
Figure 13:
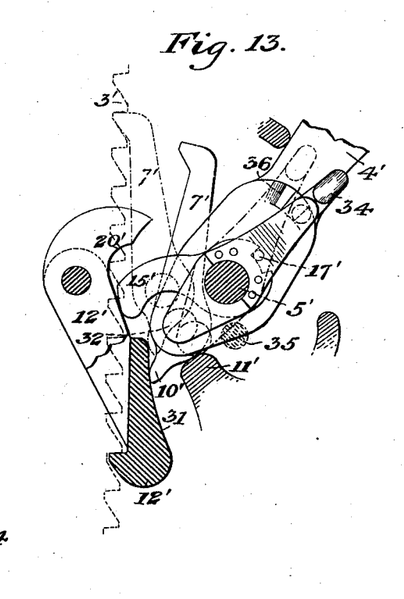

In Figs. 12 to 15, inclusive, I show another form of the invention, wherein the cam on the pin of the lifting-pawl is done away with and the pawl is thrown in by a cam-surface upon the detent-pawl and the mechanism for changing the movement is altered and simplified. In this form, in which similar parts are indicated by similar numerals by the prime-mark, the detent-pawl 12' is provided with an extension of the cross-bar portion forming a cam 31, which is arranged to act upon the tail 10' of the lifting-pawl to throw it in after it has been retracted in the lowering movement. In this form instead of forcing the prop upwardly by a projecting portion of the pawl-pin I provide a lifting-lug 32 on a lever 33, which is pivoted to the pin 5' of the lever. This lever is provided at its rear end with a thumb-piece 34 and has a spring-pressed stop 35, which engages a lug 36 on the lever-head when in position for lowering. In this form in lowering step by step as the lever is raised the tail 10' of the lifting-pawl engages the stop 11' of the casing, thus retracting the upper pawl into the position shown in full lines in Fig. 13. As the lever is then lowered the cam 31 of the detent-pawl acting upon the moving tail 10' will throw the lifting-pawl inwardly into engagement with the next tooth above, as shown in dotted lines in Fig. 13. On the further down movement of the lever the projection 32 will force the prop over the cam-face 20' of the detent-pawl and then into propping position, as shown in Fig. 12. As the lever is now lifted to lower the bar the prop will retain its position until the detent-pawl passes the point of the next tooth, when the pin 17' will engage the notched portion of the prop and force its inner end downwardly, thus releasing the detent and allowing it to engage the next tooth. When it is desired to lift the bar, the lever 33 is swung to the other side of the lug 36, and the projection 32 will then be inoperative and will not act to move the prop into propping position. A single stationary stop 36 may be used on the casing in this form, which will act during the short stroke when lifting, but will not act in lowering, owing to the changed position of the lever 33.

Figure 16:
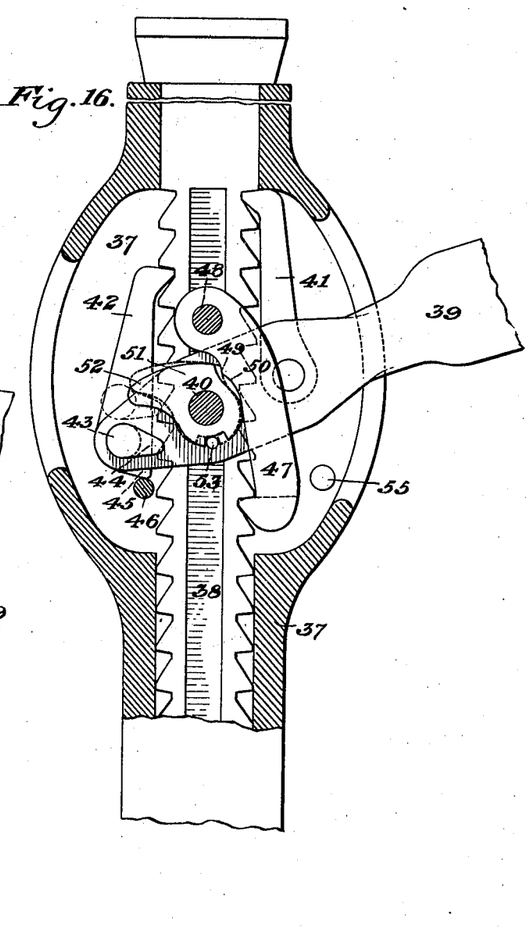
Fig. 16 is a sectional side elevation showing the invention applied to a double-toothed bar, the parts being shown in raising position.
Figure 17:
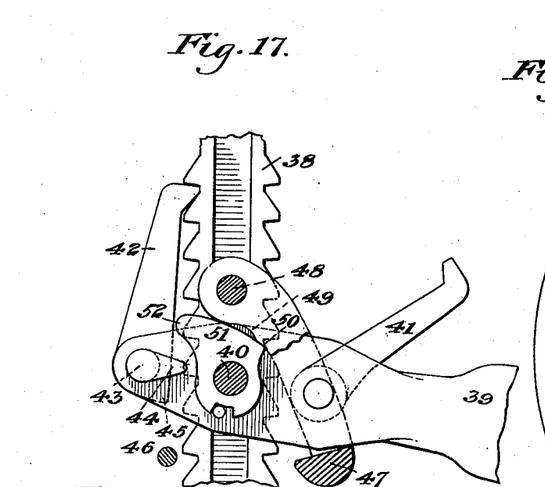
Fig. 17 is a partial side elevation showing the parts in lowering position.
Figure 18:
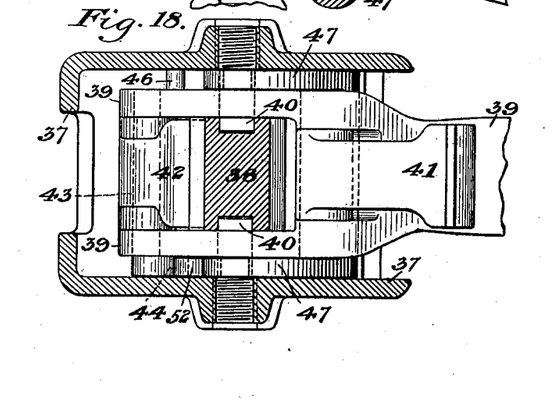
Fig. 18 is a sectional top plan view of the same.
Figure 20:
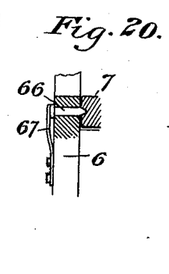
Fig. 20 is a detail view of a retarding device which I may employ.

In Figs. 16, 17, and 18 I show the invention as applied to the jack having a double-toothed bar. In this form 37 is the casing, and 38 the bar, having teeth on opposite sides. The lever 39 is provided with a forked head, which embraces the lifting-bar and is pivoted upon opposite pins 40. A lifting-pawl 41 of ordinary form is pivoted to the inner side of the head, while another lifting-pawl 42 is pivoted between the outer ends of the forked portion, this pawl 42 having a pivot-pin 43, provided with a projection 44 at one end. This pawl is provided with a tail 45, which in certain positions engages a pin 46, extending between the two sides of the casing. A third detent-pawl 47 of U-shaped form is pivoted to pins 48 in the casing, its legs embracing the forked head of the lever. This detent-pawl engages the teeth on one side below the other pawls, and one of its legs is provided with a cam portion 49 and a propping-surface 50, adapted to be engaged by a tilting prop 51, pivoted to one of the lever-pivots 40. This prop has a nose 52, adapted to engage the projection 44 of the lever 42, and a pin 53 on the lever moves within a lower notched portion of this latch or prop. In moving the lifting-bar upwardly the three pawls are used, thus giving a double-acting jack with a detent-pawl. In these movements the prop and the projection 44 perform no function, and the pawl 41, abutting against the upper end of the casing, limits the upward movement of the lever, while a movable pin 55 limits the downward movement of the lever to prevent forcing out of the detent. When it is desired to give a step-by-step lowering, the lever is moved downwardly a sufficient distance to enable the pawl 41 to be thrown back through the slot in the casing to bring it out of action. In this condition the lever is lowered to take the weight upon the pawl 42, and the stop 55 then being pulled sidewise the lever in its further downward movement through the pin 53 swings the prop over the cam-face 49 to force out the detent and then into engagement with the propping-face 50 to hold out the detent. As the lever is now allowed to rise in lowering the load the detent will be held out until the pin 53 reaches the other end of the notch in the prop, when the prop will be swung back, allowing the detent to swing by gravity into the next upper tooth. In the further up movement after the detent has engaged the tail of the pawl 42 will strike the pin 46, thus throwing back the pawl. Then on the down movement of the lever the finger 44 will engage the nose 52, and thus tilt the pawl 42 inwardly into engagement with the next tooth. In Fig. 17 I show the parts in the position assumed when the detent is propped out in the last part of the down movement in taking the load from the lifting-pawl during lowering.

In Fig. 19 I show a form wherein the detent-pawl 54 projects upwardly and straddles the lifting-pawl 55 and the lever-head 56. The lower ends of the legs of the detent-pawl are pivoted to stub-shafts 57 in the sides of the casing between the lever-pivot 58 and the teeth of the bar 59. The one leg of the detent is provided with an inwardly-curved portion 60 and a shoulder 61, which is engaged by the pin 62 upon the lever to throw in the detent at the proper time in step-by-step lowering, the pin thereafter traveling within the curved face 60. During this lowering the tail 62 of the lifting-pawl 55 engages the pin 63 on the casing, thus throwing it back in the excess movement as in the other forms, and as the lever is then depressed this pawl is forced in to engage the next upper tooth by an inclined face 64 on the detent, which is then holding the load. As the depression of the lever continues a pin 65 on the lever-head forces back the detent-pawl, so that it falls into the position shown in full lines. It retains this position by gravity until the load is lowered by allowing the lever to rise to such a point that the pin 62 engages shoulder 61 and throws in the detent to engage the next tooth, and after this on the further depression of the lever the lifting-pawl is again thrown out. The limiting-stops to prevent the excess movement in raising may be used as in the first form.

By "excess movement" I mean the continued movement of the lever after the load has been taken by one of the pawls.

The advantages of my invention will be apparent to those skilled in this art. The parts are simple, few in number, and may be easily and cheaply made and assembled. Only one piece is used besides the pawls in reversing the movement, this piece being in the nature of a prop, which is positively moved into propping position by the lever and is then forced out of this position by the lever to release the pawl at the proper time. The movements of the lifting-pawl are under positive control during lowering, it being moved back and forced in by the movements of the lever. The lowering action is not dependent upon the action of a weight or spring, and the only gravity movement is that of the detent-pawl when it is released. The amount of throw of the pawls is easily regulated and changed by changing the shape of the cam-surfaces. The movement of the bar may be reversed either by changing movable stops which limit the movement of the lever or by shifting the means for moving the prop into propping position, and in the first case the movement is reversed by merely changing from a long to a short stroke. The position of the detent-pawl is of advantage, as it makes the mechanism compact and brings the pawl into position where the prop device may act upon it directly without complicated connections. The system is easily adaptable to single or double toothed jacks of different varieties and is not liable to get out of order.

Many variations may be made in the form and arrangement of the pawls, their connections, the prop device, and method of operating it, as well as in the general form of the jack and lever, without departing from my invention.

I claim—

1. A jack having a toothed bar and a plurality of pawls, a lever, and mechanism actuated by the lever and arranged to force out both of said pawls positively and successively during the step-by-step lowering; substantially as described.

2. A jack having a plurality of pawls, a pivoted prop device swinging about a fixed center with respect to the lever and arranged to act upon one of the pawls, and mechanism actuated by the lever for moving the prop into and out of operative position during step-by-step lowering; substantially as described.

3. A jack having a plurality of pawls, a prop device swinging about a fixed center with respect to the lever and arranged to act upon one of the pawls, and mechanism for positively moving the prop into and out of operative position during lowering, said prop being inoperative during raising, substantially as described.

4. A jack having a plurality of pawls, one of which is a detent-pawl, a prop device swinging about a fixed center with respect to the lever and arranged to act upon said detent-pawl, and mechanism for positively moving the prop device into and out of operative position during step-by-step lowering; substantially as described.

5. A jack having a toothed bar, and a plurality of pawls, a lever, mechanism actuated by the lever and arranged to force out both of said pawls positively and successively during step-by-step lowering, a prop arranged to hold out one of said pawls, and mechanism for setting and tripping the said prop; substantially as described.

6. A jack having a lifting-pawl mounted on the lever, a device actuated by the lever and arranged to force said pawl outwardly, a catch arranged to retain the pawl in retracted position, and means for then forcing the pawl inwardly, said parts being adapted to act during step-by-step lowering; substantially as described.

7. A jack having a toothed bar, a plurality of pawls, a lever, and a single element acted upon directly by the lever and arranged to act directly upon a pawl to force it out during step-by-step lowering; substantially as described.

8. A jack having a plurality of pawls, one of which is a detent-pawl having a projecting tailpiece, and a detent or prop device arranged to act upon the tailpiece during the step-by-step lowering; substantially as described.

9. A jack having a plurality of pawls, one of which is a detent-pawl having a tail portion with a cam-surface thereon, and a member actuated by the lever and arranged to act upon the cam-surface and move the detent outwardly in step-by-step lowering; substantially as described.

10. A jack having a toothed bar, a plurality of pawls, a lever, and a single propping element arranged to act directly upon a pawl, to prop and hold it out of engagement during step-by-step lowering, said propping element being actuated directly by the lever; substantially as described.

11. A jack having a toothed bar, a plurality of pawls at least one of which has a projecting tailpiece, a lever, and a device arranged to act upon a pawl arm or tail to force said pawl out of engagement with the teeth during step-by-step lowering; substantially as described.

12. A jack having a toothed bar, a lever, a lifting-pawl and detent-pawl, and an actuating connection with the lever arranged to positively force the lifting-pawl into engagement with the teeth by cam action of a moving element, during step-by-step lowering; substantially as described.

13. A jack having a lifting-pawl mounted on the lever, an abutment on the casing arranged to contact with and force out said pawl during the lever movement, and mechanism for moving in said pawl, during step-by-step lowering; substantially as described.

14. A jack having a detent-pawl, a lifting-pawl mounted on the lever, and mechanism connected to the lever and arranged to force the lifting-pawl outwardly and inwardly during the step-by-step lowering; substantially as described.

15. A jack having a toothed bar, a plurality of pawls, a lever, a prop device arranged to hold out one of the pawls during step-by-step lowering, connections arranged to trip the prop, mechanism for throwing the tripping device out of action, and mechanism for forcing out the other pawl to give a full drop; substantially as described.

16. A jack having a lifting-pawl and a stop or abutment arranged to force the pawl out by cam action in the last part of each lowering movement; substantially as described.

17. A jack having a plurality of pawls, one of the pawls being a lifting-pawl, a stop or abutment arranged to force the lifting-pawl out, and mechanism independent of the casing for then forcing said pawl in by a cam action, during the step-by-step lowering; substantially as described.

18. A jack having a prop device arranged to act upon a pawl during step-by-step lowering, a stop arranged to prevent action of the prop during step-by-step lifting, and mechanism for preventing the action of the stop during step-by-step lowering; substantially as described.

19. A jack having a detent-pawl and a lifting-pawl, a prop device arranged to act on the detent-pawl during step-by-step lowering, a stop arranged to prevent the action of the prop during step-by-step lifting, and mechanism for preventing the action of the stop during step-by-step lowering; substantially as described.

20. A jack having a detent-pawl and a lifting-pawl, and a prop device consisting of a single pivoted element actuated directly by a lever extension and arranged to act upon the detent-pawl to produce step-by-step lowering, substantially as described.

21. A jack having a toothed bar, a plurality of pawls, an operating-lever, a device actuated by the movement of the lever having the same center of motion as that of the lever, said device being arranged to force one of said pawls out of engagement with the toothed bar during step-by-step lowering, and a tripping device arranged to permit said pawl to take the load; substantially as described.

22. A jack having a detent-pawl, and a lifting-pawl mounted on the lever, a pivoted prop arranged to force the detent out and then allow it to swing in during step-by-step lowering, lever connections arranged to actuate said prop positively in both directions, and mechanism for forcing the lifting-pawl outwardly and then moving it inwardly during step-by-step lowering; substantially as described.

23. A jack having a rack-bar, a detent-pawl, a lifting-pawl mounted on the actuating-lever, a pivoted prop device coacting with the detent-pawl and actuated by lost-motion connection with the lever, a cam device arranged to throw out the lifting-pawl during the excess upward movement of the outer longer arm of the lever, a cam device arranged to throw in the lifting-pawl during the downward movement of the longer arm of the lever and mechanism for releasing the prop during the downward movement of the rack-bar; substantially as described.

24. A jack having a rack-bar, a detent-pawl, a lifting-pawl mounted on the actuating-lever, a pivoted prop device coacting with the detent-pawl and actuated by lost-motion connection with the lever, a cam device arranged to throw out the lifting-pawl during the excess upward movement of the long arm of the lever, a cam device arranged to throw in the lifting-pawl during the downward movement of the long arm of the lever, mechanism for releasing the prop during the downward movement of the rack-bar, a stop device, and mechanism for preventing the action of the stop device during lowering; substantially as described.

25. A jack having lifting and detent pawls, an operating-lever, a single projecting portion or element carried by said lever and arranged to directly engage the detent-pawl and disengage the same from the rack during step-by-step lowering; substantially as described.

26. A jack having a toothed bar, a plurality of pawls, an operating-lever, a projecting element or prop pivoted on the same axis as the lever and arranged to act on the detent-pawl during step-by-step lowering, said prop being inoperative during lifting; substantially as described.

27. A jack having lifting and detent pawls, an operating-lever, a projecting portion carried on the lever and arranged to directly engage the detent-pawl in step-by-step lowering, mechanism for retracting the lifting-pawl during the step-by-step lowering, and a device for holding back the lifting-pawl until forced in the next tooth; substantially as described.

28. A jack having a toothed bar, a plurality of pawls and mechanism for reversing the movement of the bar, said mechanism being actuated by the lever in its excess movement over that of moving the bar in one direction, and having a fixed relation to the actuating-lever; substantially as described.

29. A jack having a toothed bar, a plurality of pawls, mechanism arranged to move out one of said pawls at a predetermined point in the excess movement of the lever after the other pawl has taken the load in step-by-step lowering, and a stop arranged to prevent the lever from reaching said predetermined point; substantially as described.

30. A jack having a toothed bar, and a plurality of pawls, mechanism having actuating connection with the lever and arranged to move out one of said pawls at a predetermined point in the excess movement of the lever after the other pawl has taken the load in step-by-step lowering, and a stop arranged to prevent the lever from reaching said predetermined point; substantially as described.

31. A jack having a toothed bar, a plurality of pawls, mechanism arranged to move out each of said pawls at a predetermined point in the excess movement of the lever after the other pawl has taken the load, and movable stops arranged to prevent the lever from reaching said predetermined points; substantially as described.

32. A jack having a toothed bar, a plurality of pawls, a lever arranged to actuate at least one of said pawls in lifting the load, and mechanism arranged to remain in the same position during movement of the bar in either direction, said mechanism having connections with the lever arranged to force out one of said pawls at a predetermined point in the excess movement of the lever after the load has been taken on the other pawl in step-by-step lowering; substantially as described.

In testimony whereof I have hereunto set my hand.

L. A. CONNER, JR.

Witnesses:
  GEO. B. BLEMING,
  WARREN W. SWARTZ.